Patented Apr. 10, 1928.

1,665,541

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE.

PROCESS OF PREPARING ALKYL ETHERS OF 3'-NITRO 4'-HYDROXY ORTHO-BENZOYL BENZOIC ACID.

No Drawing.   Application filed June 28, 1926. Serial No. 119,246.

This invention relates to a process of preparing alkyl ethers of 3'-nitro 4'-hydroxy ortho-benzoyl-benzoic acid and to the alkyl ethers thus prepared.

We have discovered that alkyl ethers of 3'-nitro 4'-hydroxy ortho-benzoyl-benzoic acid can be prepared from 3'-nitro 4'-chloro ortho-benzoyl-benzoic acid by treating it or its alkali salts with an alcohol and a caustic alkali, such as caustic soda or caustic potash. This reaction has been carried out using methyl alcohol and ethyl alcohol, giving the corresponding ethers. The reaction proceeds according to the following equation, in which "R" represents methyl, ethyl or any other alkyl radical and in which "M" may represent sodium or potassium or any other metal capable of forming a soluble salt in alcohol with 3'-nitro 4'-chloro-ortho-benzoyl-benzoic acid.

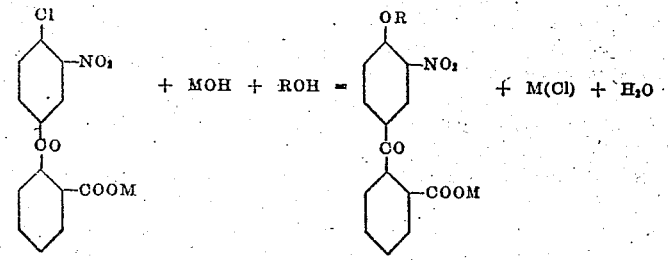

It is obvious that other halogen derivatives than the chlorine derivative may be employed, but because of its availability and cheapness the chlorine derivative is preferred.

These ethers form at various reaction temperatures, at room temperature very slowly and at the boiling point of the reaction mixture more rapidly. The amount of alkali used for this reaction is approximately one and one-half molecular weights to one molecular weight of the 3'-nitro 4'-chloro-ortho benzoyl benzoic acid salt, or two and one-half molecular weights of the alkali to one molecular weight of the free acid. We have found that, generally speaking, the speed of reaction increases the higher the concentration of the alkali used.

These ethers are crystalline bodies, varying in color from white when pure to a pale yellow when crude. They are easily soluble in alcohol and other organic solvents. They are also easily soluble in dilute caustic soda solution, in soda ash solution and in water containing ammonia, but are practically insoluble in dilute mineral acids. The alkaline solutions of the ethers are of a deep yellow color and the ethers can be precipitated from these alkaline solutions by the addition of common salt or an excess of alkali or by the addition of acid, in the first two cases the corresponding alkali salts being precipitated and in the third case, the free acid. Upon boiling the alkaline solutions, the ethers are transformed into 3'-nitro 4'-hydroxy ortho-benzoyl-benzoic acid, the preparation of which is described in our co-pending application, "3'-nitro 4'-hydroxy ortho-benzoyl benzoic acid and a process of making the same," executed of even date herewith.

Without limiting our invention to any particular procedure, the following examples illustrate the application of our invention in the preferred form:

Methyl ether.

To 610 parts by weight of methyl alcohol of 90% strength by weight, are added 305 parts by weight of 3'-nitro 4'-chloro-ortho-benzoyl-benzoic acid. The mixture is heated to 40° C. and a caustic soda solution, made up of 500 parts by volume of methyl alcohol of 90% strength by weight and 100 parts by weight of caustic soda, added over a period of 4 to 5 hours, keeping the temperature at all times at 40° C. The reaction is then regarded as finished and the mass is neutralized by the addition of about 200 parts by weight of hydrochloric acid 20° Bé. The alchohol is then distilled off, maintaining the volume of the original reaction mass by frequent additions of water. When the mass is free of alcohol, it is cooled to 20° C., diluted with 2000 parts by weight of cold water and filtered. The cake, which is the 3'-nitro 4'-methoxy-ortho-benzoyl-benzoic acid, is dried at 100° C. The yield is close to that expected theoretically and the crude product melts at 182 to 184° C. The crude product may be purified by recrystallizing it from dilute methyl alcohol, after which operation the melting point rises to 188 to 189° C.

Ethyl ether.

In 2500 parts by volume of ethyl alcohol, 80% by weight, are dissolved 140 parts by weight of potassium hydroxide. To this solution at a temperature of 20° C. are added 305 parts by weight of 3'-nitro 4'-chloro-ortho-benzoyl-benzoic acid. The mass is now heated up slowly over a period of 30 to 40 minutes, to 60° C. The reaction is now considered completed and the reaction mass is neutralized with about 200 parts by weight of hydrochloric acid, 20° Bé. After diluting to a total volume of 5000 parts by volume with hot water, the mass is cooled to 20° C., and filtered. The precipitated crystals after filtration are dried at 100° C. The melting point on this product is 160 to 162° C. Upon further purification from dilute alcohol, the melting point rises to 164 to 165° C. The yield is close to that expected theoretically.

We are aware that numerous details of the process may be varied without departing from the spirit of this invention, and we do not desire limiting the patent granted other than as necessitated by the prior art.

We claim as our invention:—

1. The process of preparing 3'-nitro 4'-alkyl-ether ortho-benzoyl-benzoic acid, which comprises treating 3'-nitro 4'-halogen-ortho-benzoyl-benzoic acid with an alcohol in the presence of an alkaline reacting substance.

2. The process of preparing 3'-nitro 4'-alkyl-ether-ortho-benzoyl-benzoic acid, which comprises treating 3'-nitro 4'-chloro-ortho-benzoyl-benzoic acid with an alcohol in the presence of caustic alkali.

3. The process of preparing 3'-nitro-4'-methoxy-ortho-benzoyl-benzoic acid, which comprises heating 3'-nitro 4'-chloro-ortho-benzoyl-benzoic acid with methyl alcohol in the presence of caustic alkali.

4. The process of preparing 3'-nitro 4'-alkyl-ether-ortho-benzoyl-benzoic acid, which comprises treating 3'-nitro 4'-chloro-ortho-benzoyl-benzoic acid with an alcohol in the presence of an alkaline reacting substance.

5. The process of preparing 3'-nitro 4'-alkyl-ether-ortho-benzoyl-benzoic acid, which comprises reacting upon 3'-nitro 4'-chloro-ortho-benzoyl-benzoic acid with an alcohol in the presence of caustic alkali, the alkali being in the proportion of two and one-half molecular weights to one molecular weight of the free acid.

6. The process of preparing 3'-nitro 4'-alkyl-ether-ortho-benzoyl-benzoic acid which comprises reacting upon 3'-nitro 4'-chloro-ortho-benzoyl benzoic acid and its salts with an alcohol in the presence of caustic alkali, neutralizing and filtering out the 3'-nitro 4'-alkyl-ether-ortho-benzoyl-benzoic acid.

7. As a new article of manufacture, alkyl ethers of 3'-nitro 4'-hydroxy-ortho-benzoyl-benzoic acid, having most probably the following formula:

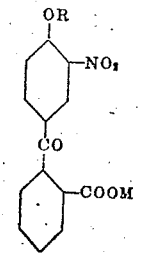

wherein R represents any alkyl group such as methyl, ethyl and the like and M represents a hydrogen or metal atom.

8. As a new article of manufacture, 3'-nitro 4'-methoxy-ortho-benzoyl-benzoic acid, having most probably the following formula:

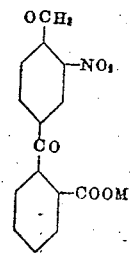

in which M represents a hydrogen or metal atom.

9. The process of preparing 3'-nitro 4'-alkyl-ether-ortho benzoyl benzoic acid, which comprises reacting upon 3'-nitro 4'-halogen-ortho-benzoyl-benzoic acid with an alcohol in the presence of caustic soda.

In testimony whereof we have hereunto subscribed our names.

IVAN GÜBELMANN.
HENRY J. WEILAND.
OTTO STALLMANN.